June 27, 1967  G. F. VANDERSCHMIDT ET AL  3,327,583
APPARATUS WITH DIFFUSELY REFLECTING HOLLOW HOUSING
FOR MEASURING ABSOLUTE REFLECTIVITY
OF A SURFACE AND THE LIKE
Filed July 16, 1962
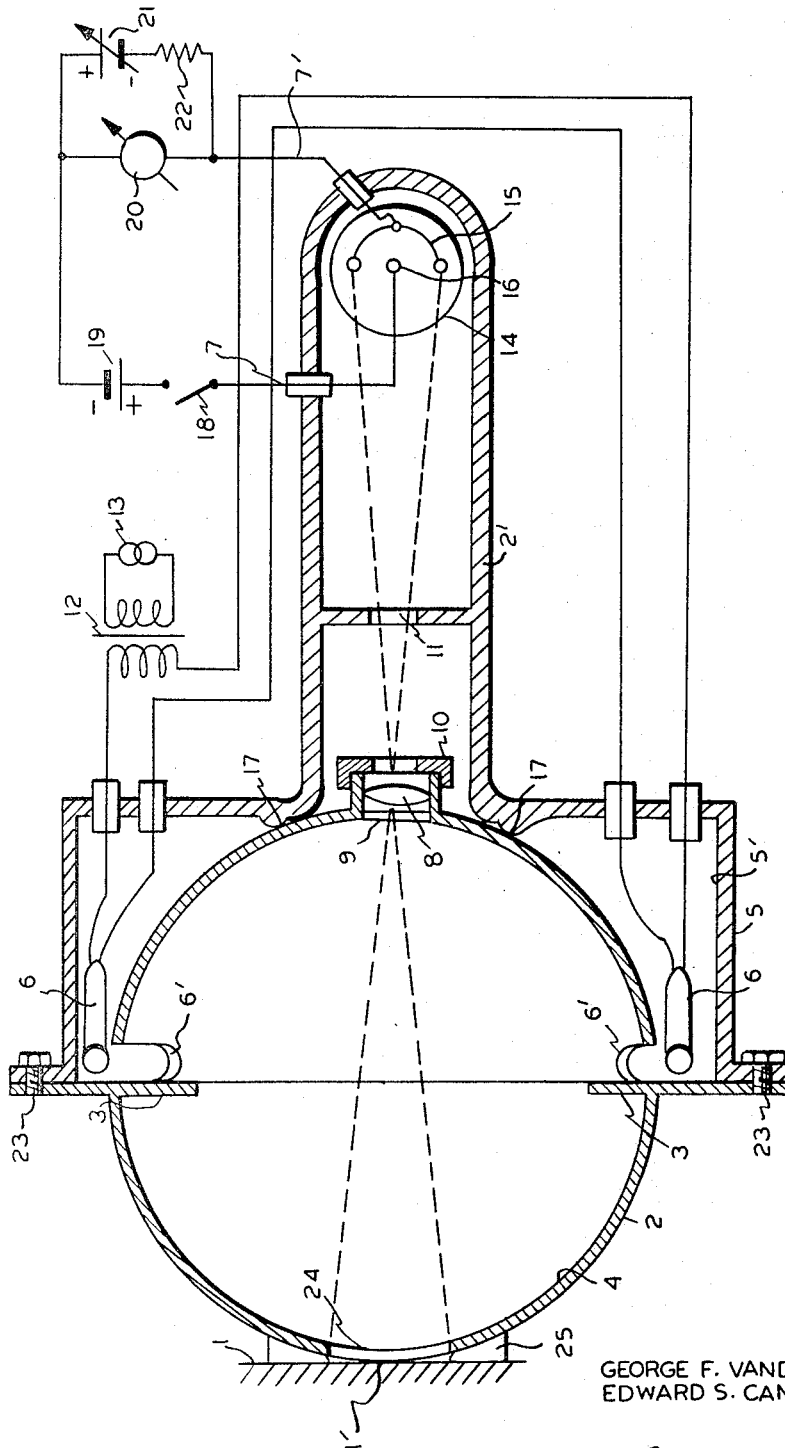
INVENTORS
GEORGE F. VANDERSCHMIDT
EDWARD S. CANDIDUS
BY *Rines and Rines*
ATTORNEYS

United States Patent Office 3,327,583
Patented June 27, 1967

3,327,583
APPARATUS WITH DIFFUSELY REFLECTING HOLLOW HOUSING FOR MEASURING ABSOLUTE REFLECTIVITY OF A SURFACE AND THE LIKE
George F. Vanderschmidt and Edward S. Candidus, Boston, Mass., assignors to Lion Research Corporation, Cambridge, Mass., a corporation of Massachusetts
Filed July 16, 1962, Ser. No. 209,897
8 Claims. (Cl. 88—14)

The present invention relates to methods of measuring the absolute reflectivity of a surface and to novel reflectometer apparatus.

The reflectivity of a surface is defined as the ratio of total energy reflected thereby to the total energy incident upon the surface. Numerous reflectometers have been evolved throughout the years for measuring the reflectivity of surfaces in the light-wave region. As an illustration, such measurements are important in determining the aging and other characteristics of paints and related finishes, and in determining changes in the optical properties of other surfaces. Basically, such prior-art reflectometers have been in the form of laboratory or bench equipment that are inherentialy incapable of a high degree of portability and that are not adapted for application to predetermined surfaces, at will. In addition, such reflectometers have not been conveniently usable for ultraviolet measurements and have not been readily adjustable to permit rapid changing of the wavelengths of radiation to be employed in the measurement.

Absolute reflectivity measurements, also, have been difficult to obtain, resort being had, rather, to the comparison of the object to be measured with the effect produced by the insertion of a graded strip of a plurality of densities. The accuracy of such relative reflectivity measurements, moreover, has left a great deal to be desired.

An object of the present invention, accordingly, is to provide a new and improved method of and apparatus for measuring reflectivity of a surface that shall not be subject to any of the above-described disadvantages; but that, rather, shall provide for accurate absolute reflectivity measurements with a high degree of portability.

A further object is to provide a reflectometer that is particularly adapted for employment in the ultra-violet range but that is readily adjustable to permit measurements in other wavelength ranges.

Still an additional object is to provide an improved reflectometer of more general utility, also.

Other and further objects will be explained hereinafter and will be more particularly pointed out in connection with appended claims.

In summary, however, the reflectometer of the present invention involves a housing in the form of a substantially symmetrical surface of revolution provided with a pair of aligned apertures disposed in opposite wall surfaces thereof, one of the apertures being adapted to be juxtaposed to a surface the reflectivity of which is to be measured, in order to cover the same with the housing, and the other aperture being connected to an optical system for directing radiation reflected from the surface along a predetermined direction away from the surface. Further aperture means is provided at a region of the housing between the pair of apertures, and illuminating means is carried by the housing and connected to transmit radiation through the further aperture means into the housing. Means is also provided for preventing direct illumination of the said surface through the said one aperture by the illuminating means and for insuring the diffuse illumination of the surface after reflection of the radiation from the inner wall surfaces of the housing. The said optical system is adjusted to insure interception and directing of radiation reflected from the said surface only and not from any adjacent wall surfaces of the housing, and an illumination-to-electric energy transducer is disposed along the said predetermined direction and mounted as a unit with the said optical system and housing. Preferred constructional details are hereinafter set forth.

The invention will now be described in connection with the accompanying drawing, the single figure of which is a combined longitudinal sectional view and circuit diagram of a preferred embodiment of the invention.

Referring to the drawing, the reflectometer embodies a housing 2 in the form of a substantially symmetrical surface of revolution, illustrated as a sphere. The housing 2 is provided with a pair of preferably diametrically opposed aligned apertures 24 and 9 on opposite wall surfaces of the housing. The aperture 24 is shown juxtaposed to a surface 1, the reflectivity of which is to be measured; the spherical housing 2 being brought into engagement with the surface 1 to cover a predetermined portion or area 1' of the surface 1. A front gasket 25, as of felt or the like, insures that such predetermined area 1' cannot receive external radiation, but only the desired radiation from within the housing 2.

In accordance with the invention, the area 1' of the surface 1 thus covered by the aperture 24 and the housing 2, is illuminated with radiation, such as, for example, ultraviolet light, that is diffuse in character in order to insure that such radiation may be reflected from the surface area 1 in a diffuse, and not a specular, manner. In diffuse reflection, the distribution of reflected light substantially follows a cosine law relating intensity to angle of reflectance. In specular reflection, on the other hand, the angle of incidence equals the angle of reflection, as in a mirror. Only if the light reflected from the surface 1 is of diffuse character, however, can an indication of the absolute reflectivity of the surface 1 be provided by the monitoring of the diffuse light reflected from a portion or sub-area only of the surface 1', as explained, for example, by Edwards et al., in the Journal of the American Optical Society, vol. 51, p. 1279 (1961).

The illumination is produced within the housing 2 by means of a pair of lamps 6 that are shown disposed at a further pair of diametrically opposed apertures 6' in portions of the housing walls between the apertures 24 and 9. In the case of ultraviolet operations, these lamps 6 are preferably mercury lamps that have a strong ultraviolet wavelength component, and they are shown mounted along a diameter that is orthogonal to that along which the apertures 24 and 9 are disposed, in order to permit the inner spherical wall surface 4 to produce a symmetrical and random diffuse reflection of the light radiation that is to illuminate the portion 1' of the surface 1, exposed by the aperture 24. Further to this end, substantially diametrically opposed baffles 3 extend into the housing 2 insuring that direct illumination from the lamps 6 does not reach the surface 1'. The inner walls 4 of the surface 2 are preferably provided with a diffuse reflecting surface of high reflectivity, such as a magnesium oxide coating or the like.

At the aperture 9, a lens 8 focuses the light that has been diffusely reflected from the predetermined area 1' of the surface 1 through appropriate filters 10, such as an ultraviolet-wavelength filter in the above example, and upon an aperture stop 11 preferably disposed substantially in the focal plane of the lens 8. The size of the aperture 11 is regulated to insure that the image produced by the lens 8 does not include any portion of the inner walls of the housing 2 adjacent the aperture 24, but is restricted to the included surface area 1' alone, or a predetermined part thereof.

The thusly focused light is then directed to an illumination-to-electric-energy transducer, such as a photocell 14, of a type responsive to the ultraviolet light or to other predetermined wavelength bands that may be employed. When a switch 18 is closed, the anode 16 of the photocell or similar device 14 is connected by conductor 7 through a source of potential 19 to an upper terminal of an electrometer or other photocell-current indicating instrument 20, the lower terminal of which is connected by conductor 7' to the cathode 15 of the photocell 14. Bucking current for cancelling a zero reading on the electrometer or other similar indicator 20 may be provided by a variable voltage source 21 in series with a resistor 22, connected across the indicator 20.

In the portable construction illustrated in the drawing, the optical system 8–10–11 is covered by and at least partially disposed within a tubular extension 2' protruding substantially diametrically outward from the aperture 9 and containing at its far end, the photocell or similar device 14. It is to be understood that the meter or other indicator 20 may also, if desired, be supported by the structure 2–2'. This supporting of the tubular extension 2' by the housing 2 is effected by means of a cup-shaped bracket 5 which may be bolted, as at 23, to outwardly extending flanges. The cup-shaped member 5 may also support the lamps 6 with the illumination and photocell apparatus thus readily detachable from the housing 2, as for the purpose of substituting lamps 6 and photocell 14 of different wavelength bands. The substitutions may, indeed, be carried by replacement brackets 2'–5. In addition, the removal of the detachable bracket 2'–5 provides ready access to the filter 10 to permit the appropriate replacement of the same for different predetermined wavelength bands. Besides the advantageous results above discussed, the extension 2' provides a ready handle for the application of the instrument to surfaces to be measured.

In order to prevent stray leakage of light from the lamps 6 into the housing 2 or the extension 2', light seals 17 may be provided around the region of the lens 8. The walls of the cup-shaped member 5 may also serve to prevent the escape of stray radiation, in general, the inner walls 5' thereof being preferably of reflecting material, such as silver or aluminum foil.

Energy for illuminating the lamps 6 may be provided by means of a transformer 12, energized from a source 13, to feed the lamps 6 in series. Other types of radiation-producing devices may also clearly be employed.

Not only are the ends of high portability and measurement over wide spectral ranges, including the ultraviolet, attained with the construction of the present invention, but the structure also permits absolute reflectivity measurement, as indicated upon the meter or similar device 20, without the necessity for indirect schemes, such as the graded-density strips and the like, before discussed. To this end, the apparatus, in accordance with the method underlying the invention, is applied first to a surface 1 of known reflectivity, producing an indication of a magnitude of electric energy transduced by the photocell 14 on the meter 20 that may be identified with that value of reflectivity. Since the law of response of the photocell or other transducer 14 and the indicator 20 may be predetermined, such as a substantially linear response (intensity of radiation as a function of electric signal magnitude) for the ultraviolet range in the case of a Type 935 photocell, the subsequent application of the instrument to a surface 1 of unknown reflectivity, substituted for the first known surface, provides a direct and absolute correlation of the magnitude of the indication on the meter 20 with the reflectivity of the unknown surface.

While a spherical housing 2 is preferred, other symmetrical structures, such as cylindrical housings, that enable the production of uniform diffuse light may be employed; and more or less than two lamps may also be used. Further modifications will also occur to those skilled in the art, and all such are considered to fall within the spirit and scope of the invention as defined in the appended claims.

What is claimed is:

1. A reflectometer having, in combination, a hollow housing formed as a surface or revolution and provided with diffusely reflective inner wall surfaces and with a pair of aligned apertures disposed in opposite wall surfaces thereof, one of the apertures being adapted to be juxtaposed to a test surface, the reflectivity of which is to be measured, an optical system externally connected to the other aperture for receiving and directing radiation reflected from the test surface through the other aperture along a predetermined direction away from the test surface, further aperture means in the wall surfaces and provided at a region of the housing between the pair of apertures, illuminating means carried by the housing and connected to transmit radiation through the further aperture means into the housing, light-obstructing means surrounding said one aperture and in contact with said test surface for preventing external illumination of the said test surface by ambient light, said further aperture means and said illuminating means being arranged to ensure that said test surface is symmetrically illuminated only by radiation randomly and diffusely reflected from the inner wall surfaces of the housing, light-obstructing means disposed between said illuminating means and said one aperture for preventing direct illumination of the test surface by said illuminating means, said optical system having transducer means disposed at the remote end of said optical system and along the said predetermined direction and mounted as a unit with the said optical system and housing to convert radiation reflected from said test surface to an electrical signal, and light-obstructing means located between said other aperture and said transducer means for restricting the radiation received by said transducer means only to radiation diffusely reflected from the said test surface and not from the adjacent wall surfaces of the housing.

2. A reflectometer as claimed in claim 1 and in which at least part of the said unit of the optical system and transducer is detachably mounted to the housing.

3. A reflectometer as claimed in claim 1 and in which the illuminating means comprises ultra-violet lamp means, the said optical system includes an ultra-violet filter, and the said transducer means is responsive in the ultra-violet range.

4. A reflectometer as claimed in claim 1 and in which the illuminating means comprises a pair of similar lamps and the further aperture means comprises a pair of apertures associated with said lamps, respectively, and substantially oppositely disposed with respect to said housing.

5. A reflectometer as claimed in claim 1 and in which the said optical system comprises a tubular enclosure extending from the said other aperture externally of the housing.

6. A reflectometer as claimed in claim 1 and in which the housing is spherical, said one aperture and said other aperture are oppositely disposed along one diameter of the housing, and the said further aperture means comprises a pair of apertures oppositely disposed along a diameter of the housing substantially orthogonal to the first-mentioned diameter.

7. A reflectometer as claimed in claim 1 and in which the second-mentioned light-obstructing means comprises baffle means extending into the housing at the said further aperture means.

8. A reflectometer as claimed in claim 1, further comprising electrical circuit means connected to said transducer means for measuring the magnitude of said electrical signal.

(References on following page)

References Cited

UNITED STATES PATENTS

| | | | |
|---|---|---|---|
| 1,780,231 | 11/1930 | Hardy | 88—14 |
| 1,960,169 | 5/1934 | Schoenberg | 88—14 |
| 2,131,095 | 9/1938 | Cox | 88—14 X |
| 2,185,690 | 1/1940 | Lane | 250—228 X |
| 2,565,151 | 8/1951 | Taylor | 88—83.3 |
| 2,578,625 | 12/1951 | Bowers et al. | 88—14 |
| 2,665,388 | 1/1954 | Bickley. | |

OTHER REFERENCES

Baumgartner, "A Light-Sensitive Cell Reflectometer," The General Electrical Review, November 1937, pp. 525–527.

Smith et al., "Tomato Classification," Electronics, January 1952, vol. 25, No. 1.

JEWELL H. PEDERSEN, *Primary Examiner.*

DAVID H. RUBIN, *Examiner.*

T. L. HUDSON, W. A. SKLAR, *Assistant Examiners.*